(12) United States Patent
Harasawa et al.

(10) Patent No.: US 6,713,149 B2
(45) Date of Patent: Mar. 30, 2004

(54) MAGNETIC RECORDING MEDIUM

(75) Inventors: Takeshi Harasawa, Kanagawa (JP); Hitoshi Noguchi, Kanagawa (JP); Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 63 days.

(21) Appl. No.: 10/194,245

(22) Filed: Jul. 15, 2002

(65) Prior Publication Data

US 2003/0087124 A1 May 8, 2003

(30) Foreign Application Priority Data

Jul. 16, 2001 (JP) ..................................... P.2001-215423

(51) Int. Cl.$^7$ .............................................. G11B 5/706
(52) U.S. Cl. ................ 428/65.3; 428/304.4; 428/315.7; 428/329; 428/336; 428/694 BH
(58) Field of Search ........................... 428/308.4, 315.7, 428/317.9, 329, 336, 65.3, 694 BH, 304.4

(56) References Cited

U.S. PATENT DOCUMENTS 5,139,866 A * 8/1992 Araki et al. ................. 428/323
6,620,499 B2 * 9/2003 Masaki ....................... 428/329

FOREIGN PATENT DOCUMENTS

JP 7-40343 5/1995

* cited by examiner

Primary Examiner—Stevan A. Resan
(74) Attorney, Agent, or Firm—Sughrue Mion, PLLC

(57) ABSTRACT

A magnetic recording medium is disclosed, comprising a support having provided thereon a magnetic layer containing a ferromagnetic powder and a binder as main components, wherein the ferromagnetic powder is a hexagonal ferrite powder having an average tabular diameter of from 15 to 40 nm, the perpendicular factor of squareness ratio SQ of the magnetic layer is from 0.1 to 0.55, the specific surface area and the total pore volume per weight of the magnetic layer by a nitrogen adsorption method are from 0.1 to 50 m$^2$/g and from 0.001 to 1 ml/g, respectively, and the magnetic layer thickness is from 0.02 to 0.3 μm.

4 Claims, No Drawings

MAGNETIC RECORDING MEDIUM

FIELD OF THE INVENTION

The present invention relates to a coating type magnetic recording medium (i.e., a magnetic recording particulate medium) capable of high density recording, in particular, a magnetic recording medium for high density recording comprising a magnetic layer containing a hexagonal ferrite powder.

BACKGROUND OF THE INVENTION

In the field of the magnetic disc, along with the increase in the amount of data to be dealt with, the increase of the capacity of a floppy disc has been demanded.

In the field of the magnetic tape also, with the prevalence of the office computer, such as minicomputers, personal computers and work stations, magnetic tapes for recording computer data as external storage media (a so-called backup tape) have been eagerly studied. For putting magnetic tapes for such usage to practical use, the improvement of recording capacity has been strongly demanded conjointly with the miniaturization of a computer and the increase of information processing ability (i.e., the increase of throughput) for achieving high capacity recording and the miniaturization.

A magnetic recording medium comprising a magnetic layer containing barium ferrite (BaFe) has been used. For example, the invention which restricts a squareness ratio SQ in the perpendicular direction to the range of from 0.3 to 0.55, and a magnetic layer thickness to 0.8 $\mu$m or less is disclosed in JP-A-8-235570 (the term "JP-A" as used herein means an "unexamined published Japanese patent application"), and the invention which restricts a squareness ratio SQ in the perpendicular direction to the range of from 0.3 to 0.53, and the particle size of magnetic substances to 20 to 200 nm is disclosed in JP-B-7-040343 (the term "JP-B" as used herein means an "examined Japanese patent publication").

Since magnetic heads working with electromagnetic induction as the principle of operation (induction type magnetic heads) are usually used in these magnetic recording media, their use in the field of higher density recording and reproduction is limited. That is, it is necessary to increase the number of winding of the coil of a reproduction head to obtain larger reproduction output, but when the winding number increases, the inductance increases and the resistance at high frequency heightens, as a result, the reproduction output lowers. Reproduction heads which work with MR (magneto-resistance) as the principle of operation are proposed and come to be used in hard discs in recent years. As compared with the induction type magnetic disc, several times of reproduction output can be obtained by the MR head. Further, since an induction coil is not used in the MR head, noises generated from instruments, e.g., impedance noises, are extremely reduced, therefore, it becomes possible to obtain a great S/N ratio by lowering the noise coming from magnetic recording media. In other words, good recording and reproduction can be done and high density recording characteristics can be drastically improved by lessening the noise of magnetic recording media hiding behind the noises coming from instruments.

SQ, a magnetic layer thickness and the particle size of magnetic substances are restricted in conventional magnetic recording media as described above, but characteristics cannot be effectively improved in high density recording at the present time if SQ in the perpendicular direction is not smaller, a magnetic layer thickness is not thinner and the particle size of magnetic substances is not smaller.

In addition, to obtain the effect with MR heads sufficiently, not only magnetic characteristics but also head touch should be taken into consideration. Therefore, both magnetic characteristics and head touch should be taken into consideration.

That is, a magnetic recording medium which is low in noise and excellent in high density characteristics has been desired even when a conventionally used coating-type magnetic recording medium which is excellent in productivity and inexpensive is combined with an MR head.

SUMMARY OF THE INVENTION

An object of the present invention is to provide a magnetic recording medium for high density recording which is markedly improved in electromagnetic characteristics, in particular, high density recording characteristics.

The present invention is a magnetic recording medium comprising a support having provided thereon a magnetic layer containing mainly a ferromagnetic powder and a binder, wherein the ferromagnetic powder is a hexagonal ferrite powder having an average tabular diameter of from 15 to 40 nm, the perpendicular factor of squareness ratio SQ of the magnetic layer is from 0.1 to 0.55, the specific surface area and the total pore volume per weight (i.e., mass) of the magnetic layer by a nitrogen adsorption method are from 0.1 to 50 m$^2$/g and from 0.001 to 1 ml/g, and the magnetic layer thickness is from 0.02 to 0.3 $\mu$m.

The preferred embodiments of the present invention are as follows.

(1) The magnetic recording medium which is used in the reproduction using a MR head.

(2) The magnetic recording medium is a magnetic tape.

(3) The magnetic recording medium is a magnetic disc.

DETAILED DESCRIPTION OF THE INVENTION

The present inventors have found that a magnetic recording medium having a markedly improved S/N ratio in high density recording area which cannot be obtained by the prior art technique can be obtained by the above constitution, thus the present invention has been accomplished.

That is, the present invention aims to reconcile the security of magnetic characteristics with the improvement of head touch. For securing mainly the former, the present invention restricts the average tabular diameter of a hexagonal ferrite powder to 15 to 40 nm, preferably from 20 to 30 nm, the perpendicular factor of squareness ratio SQ of the magnetic layer to 0.1 to 0.55, preferably from 0.2 to 0.5, and the magnetic layer thickness to 0.02 to 0.3 $\mu$m, preferably from 0.05 to 0.15 and, at the same time, for improving mainly the latter, the specific surface area and the total pore volume per weight (i.e., mass) of the magnetic layer by a nitrogen adsorption method to 0.1 to 50 m$^2$/g, preferably from 5 to 10 m$^2$/g, and to 0.001 to 1 ml/g, preferably from 0.01 to 0.1 ml/g, respectively. The present invention is characterized in that the latter is particularly specified.

That is, an S/N or C/N ratio cannot be improved if the specific surface area and the total pore volume deviate from the above ranges, even when the requisites which contribute to the magnetic characteristics are satisfied.

The specific surface area and the total pore volume per weight (i.e., mass) of a magnetic layer by a nitrogen adsorption method are the values measured as follows.

The specific surface area and the total pore volume per weight (i.e., mass) of a magnetic layer are measured by a nitrogen adsorption method using a measuring apparatus Auto Sorb 1 manufactured by US QUANTA CHROME Co. Pores are measured by a BJH (Brrett. Joyner. Halenda) method and the volume and the specific surface area thereof are measured with Auto-Sorb 1. As the measuring procedure at this time, a sample is deaerated for five hours or more and then measurement is performed under a liquid nitrogen temperature with Auto-Sorb 1. The magnetic layer is peeled off from the sample after the measurement, the magnetic layer is deaerated and the mass is measured. The specific surface area and the total pore volume per weight (i.e., mass) of the magnetic layer can be obtained by dividing the specific surface area and the total pore volume by the weight (i.e., mass).

The means for restricting the specific surface area and the total pore volume is not particularly limited but it is effective to arbitrarily select calendering conditions.

The magnetic recording medium according to the present invention is described in detail below.

Magnetic Layer

A magnetic layer containing a hexagonal ferrite powder may be provided on either one side or may be provided on both sides of a support of the magnetic recording medium according to the present invention.

The magnetic layer provided on one side of a support may be a monolayer or may comprise a plurality of layers having compositions different from each other. In the present invention, a substantially nonmagnetic lower layer (a nonmagnetic layer or a lower layer) may be provided between a support and the magnetic layer. The magnetic layer is called an upper layer or an upper magnetic layer.

The upper layer can be coated by wet-on-wet coating (W/W) after simultaneous or successive coating of the lower layer while the lower layer coated is still wet or can be coated by wet-on-dry coating (W/D) after the lower layer coated is dried. W/W coating is preferably used in view of the productivity but wet-on-dry coating can be sufficiently used. Since the upper layer and the lower layer can be formed simultaneously by W/W coating, a surface treatment step, e.g., a calendering step, can be utilized effectively and the surface roughness of the upper magnetic layer can be improved even the layer is a thin layer.

Hexagonal Ferrite Powder

The examples of the hexagonal ferrite powders contained in the magnetic layer according to the present invention include substitution products of barium ferrite, strontium ferrite, lead ferrite and calcium ferrite, and Co substitution products. Specifically, barium ferrite and strontium ferrite of magnetoplumbite type, magnetoplumbite type ferrite having covered the particle surfaces with spinel, and barium ferrite and strontium ferrite of magnetoplumbite type partially containing a spinel phase are exemplified. The hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, the hexagonal ferrite powders containing the following elements can be used, e.g., Co—Zn, Co—Ti, Co—Ti—Zr, Co—Ti—Zn, Ni—Ti—Zn, Nb—Zn—Co, Sb—Zn—Co, and Nb—Zn. According to starting materials and producing processes, specific impurities may be contained.

The average tabular diameter of the hexagonal ferrite powders for use in the present invention is generally from 15 to 40 nm. The tabular diameter used here means the longest hexagonal diameter of the base of a hexagonal pole of a hexagonal ferrite magnetic powder, and the average tabular diameter is the arithmetic mean of it.

When reproduction is performed using a magneto-resistance head particularly for increasing track density, it is necessary to reduce noise, accordingly the tabular diameter is preferably 30 nm or less, but when the tabular diameter is smaller than 15 nm, stable magnetization cannot be obtained due to thermal fluctuation. While when the tabular diameter exceeds 40 nm, noise increases, therefore, none of such tabular diameters are suitable for high density recording. A tabular ratio (tabular diameter/tabular thickness) is preferably from 1 to 5, more preferably from 1 to 3. When a tabular ratio is small, the packing density in a magnetic layer becomes high, which is preferred but sufficient orientation cannot be obtained. When a tabular ratio is more than 5, noise increases due to stacking among particles. The specific surface area ($S_{BET}$) measured by the BET method of the particles having diameters within this range is generally from 30 to 200 $m^2$/g. The specific surface area nearly coincides with the value obtained by arithmetic operation from tabular diameter and tabular thickness. The distribution of tabular diameter/tabular thickness is in general preferably as narrow as possible. It is difficult to show specific surface area distributions in numerical values but distributions can be compared by measuring TEM photographs of 500 particles selected randomly. The distribution is in many cases not regular distribution, but when expressed by the standard deviation to the average diameter by computation, σ/average diameter is from 0.1 to 2.0. For obtaining narrow particle size distribution, it is efficient to make a particle-forming reaction system homogeneous to the utmost, particles formed are subjected to distribution-improving treatments as well. For example, a method of selectively dissolving ultrafine particles in an acid solution is also known. Coercive force (Hc) of generally from about 500 to about 5,000 Oe (=about 40 to 400 kA/m) measured in magnetic substances can be produced. Higher Hc is advantageous for high density recording but it is restricted by the capacities of recording heads. Hc can be controlled by particle diameters (tabular diameter·tabular thickness), the kinds and amounts of elements contained, the substitution sites of elements, and the reaction conditions of particle formation. Saturation magnetization ($σ_s$) is from 30 to 80 A·$m^2$/kg. $σ_s$ has the inclination of becoming smaller as particles become finer. A method of reducing the crystallization temperature or heat treatment temperature and time, a method of increasing the amount of the compounds to be added or increasing the surface treating amount may be used in manufacturing. It is also possible to use a W-type hexagonal ferrite. When magnetic powders are dispersed, the surfaces of magnetic powders may be treated with substances compatible with the dispersion media and the polymers. Inorganic or organic compounds are used as a surface treating agent. For example, oxides or hydroxides of Si, Al and P, various kinds of silane coupling agents, and various kinds of titanium coupling agents are representative examples of such a surface treating agent. The amount of these surface treating agents is from 0.1 to 10% based on the amount of the magnetic powder. The pH of magnetic powders is also important for dispersion, and in general the pH is from 4 to 12. The optimal value of the water content is dependent upon the dispersion medium and the polymer. Taking the chemical stability and the storage stability of magnetic media into consideration, pH of from 6 to 11 or so is selected. The water content in the magnetic substance also affects dispersion.

The optimal value is dependent upon the dispersion medium and the polymer, and the water content of from 0.01 to 2.0% is selected in general. Hexagonal ferrite powders of the present invention can be produced by (1) a glass crystallization method of mixing a metallic oxide which substitutes barium oxide, iron oxide andiron, and a boron oxide as a glass-forming material so as to make a desired ferrite composition, melting and quenching the mixture to obtain an amorphous product, reheat-treating the obtained product, washing and then pulverizing, to thereby obtain a barium ferrite crystal powder, (2) a hydrothermal reaction method of neutralizing a metal salt solution of barium ferrite composition with an alkali, removing the byproducts, heating liquid phase at 100° C. or more, washing, drying and pulverizing the obtained product, to thereby obtain a barium ferrite crystal powder, and (3) a coprecipitation method of neutralizing a metal salt solution of barium ferrite composition with an alkali, removing the byproducts, drying, treating at 1,100° C. or less and then pulverizing the obtained product, to thereby obtain a barium ferrite crystal powder, and any of these methods can be used in the present invention.

Lower Layer

The lower layer is described in detail below. The lower layer preferably comprises a nonmagnetic inorganic powder and a binder as main components. The nonmagnetic inorganic powder for use in the lower layer can be selected from inorganic compounds, e.g., metallic oxide, metallic carbonate, metallic sulfate, metallic nitride, metallic carbide, metallic sulfide, etc. The examples of inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred because they have small particle size distribution and various means for imparting functions, and titanium dioxide and alpha-iron oxide are more preferred. These nonmagnetic inorganic powders preferably have an average particle size of from 0.005 to 2 $\mu$m. If necessary, a plurality of nonmagnetic inorganic powders each having a different particle size may be combined, or a single nonmagnetic inorganic powder may have broad particle size distribution so as to attain the same effect as such a combination. These nonmagnetic inorganic powders particularly preferably have an average particle size of from 0.01 to 0.2 $\mu$m. In particular, when the nonmagnetic inorganic powder is a granular metallic oxide, the average particle size thereof is preferably 0.08 $\mu$m or less, and when the nonmagnetic inorganic powder is an acicular metallic oxide, the average long axis length thereof is preferably 0.3 $\mu$m or less, more preferably 0.2 $\mu$m or less. The nonmagnetic inorganic powders for use in the present invention have a tap density of generally from 0.05 to 2 g/ml, preferably from 0.2 to 1.5 g/ml; a water content of generally from 0.1 to 5 mass %, preferably from 0.2 to 3 mass %, and more preferably from 0.3 to 1.5 mass %; a pH value of from 2 to 11, and particularly preferably between 5.5 and 10; a specific surface area ($S_{BET}$) of from 1 to 100 m$^2$/g, preferably from 5 to 80 m$^2$/g, and more preferably from 10 to 70 m$^2$/g; a crystallite size of from 0.004 to 1 $\mu$m, and more preferably from 0.04 to 0.1 $\mu$m; an oil absorption amount using DBP (dibutyl phthalate) of generally from 5 to 100 ml/100 g, preferably from 10 to 80 ml/100 g, and more preferably from 20 to 60 ml/100 g; and a specific gravity of from 1 to 12, and preferably from 3 to 6. The shape of the nonmagnetic inorganic powders may be any of an acicular, spherical, polyhedral, or tabular shape. The nonmagnetic inorganic powders preferably have a Mohs' hardness of from 4 to 10. The SA (stearic acid) adsorption amount of the nonmagnetic inorganic powders is from 1 to 20 $\mu$mol/m$^2$, preferably from 2 to 15 $\mu$mol/m$^2$, and more preferably from 3 to 8 $\mu$mol/m$^2$. The pH of the nonmagnetic inorganic powders is preferably between 3 and 6. The surfaces of these nonmagnetic inorganic powders are preferably covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are particularly preferred in the point of dispersibility, and $Al_2O_3$, $SiO_2$ and $ZrO_2$ are more preferred. They can be used in combination or may be used alone. The surface treatment may be performed by coprecipitation, alternatively, the surfaces of particles may be covered with alumina in the first place, and then the alumina-covered surface may be covered with silica, or vice versa, according to purposes. The surface-covering layer may be porous layer, if necessary, but a homogeneous and dense surface is generally preferred.

The specific examples of the nonmagnetic powders for use in the lower layer in the present invention include Nanotite (manufactured by Showa Denko Co., Ltd.), HIT-100 and ZA-G1 (manufactured by Sumitomo Chemical Co., Ltd.), alpha-hematite DPN-250, DPN-250BX, DPN-245, DPN-270BX, DPN-500BX, DBN-SA1, and DBN-SA3 (manufactured by Toda Kogyo Co., Ltd.), titanium oxide TTO-51B, TTO-55A, TTO-55B, TTO-55C, TTO-55S, TTO-55D, SN-100, alpha-hematite E270, E271, E300, and E303 (manufactured by Ishihara Sangyo Kaisha Ltd.), titanium oxide STT-4D, STT-30D, STT-30, STT-65C, and alpha-hematite alpha-40 (manufactured by Titan Kogyo Co., Ltd.), MT-100S, MT-100T, MT-150W, MT-500B, MT-600B, MT-100F and MT-500HD (manufactured by Teika Co., Ltd.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, 500A and calcined products thereof (manufactured by Ube Industries, Ltd.). Particularly preferred nonmagnetic powders are titanium dioxide and alpha-iron oxide.

By the addition of carbon blacks to the lower layer, a desired micro Vickers' hardness can be obtained, surface electrical resistance (Rs) and light transmittance can be reduced as well, as are well-known effects. It is also possible to bring about the effect of stocking a lubricant by the addition of carbon blacks to the lower layer. Furnace blacks for rubbers, thermal blacks for rubbers, carbon blacks for coloring and acetylene blacks can be used as carbon blacks. Carbon blacks for use in the lower layer should optimize the following characteristics according to desired effects and sometimes more effects can be obtained by the combined use.

The carbon blacks which are used in the lower layer according to the present invention have a specific surface area ($S_{BET}$) of generally from 100 to 500 m$^2$/g, preferably from 150 to 400 m$^2$/g, a DBP oil absorption of generally from 20 to 400 ml/100 g, preferably from 30 to 400 ml/100 g, an average particle size of generally from 5 to 80 nm, preferably from 10 to 50 nm, and more preferably from 10 to 40 nm, and a small amount of carbon blacks having an average particle size larger than 80 nm may be contained in the lower layer. Carbon blacks for use in the lower layer have pH of from 2 to 10, a water content of from 0.1 to 10%, and a tap density of from 0.1 to 1 g/ml. The specific examples of carbon blacks for use in the lower layer according to the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may be surface-treated with a dispersant, may be grafted with a resin, or a part of the surface thereof may be graphitized before use. The carbon black may be previously dispersed in a binder before addition to the coating solution. Carbon blacks can be used within the range not exceeding 50 mass % based on the above nonmagnetic inorganic powders (exclusive of carbon blacks) and not exceeding 40 mass % based on the total mass of the nonmagnetic layer. These carbon blacks can be used alone or in combination. Regarding carbon blacks which can be used in the present invention, e.g., the description in *Handbook of Carbon Blacks* (edited by Carbon Black Association of Japan) can be referred to.

Organic powders can be added to the lower layer according to purposes. The examples of organic powders include an acryl styrene resin powder, a benzoguanamine resin powder, a melamine resin powder, and a phthalocyanine pigment. Besides the above, a polyolefin resin powder, a polyester resin powder, a polyamide resin powder, a polyimide resin powder, and a polyethylene fluoride resin powder can also be used. The producing methods of these organic powders are disclosed in JP-A-62-18564 and JP-A-60-255827.

The binder resins, lubricants, dispersants, additives, solvents, dispersing methods, and others used for the magnetic layer described below can be used in the lower layer and the backing layer described later. In particular, with respect to the amounts and the kinds of binder resins, additives, the amounts and the kinds of dispersants, well-known prior art techniques regarding the magnetic layer can be applied to the lower layer.

Binder

Conventionally well-known thermoplastic resins, thermosetting resins, reactive resins and mixtures of these resins are used as a binder in the present invention.

Thermoplastic resins having a glass transition temperature of from −100 to 150° C., a number average molecular weight of from 1,000 to 200,000, preferably from 10,000 to 100,000, and a polymerization degree of from about 50 to about 1,000 can be used in the present invention.

The examples of thermoplastic resins include polymers or copolymers containing, as the constituting unit, vinyl chloride, vinyl acetate, vinyl alcohol, maleic acid, acrylic acid, acrylate, vinylidene chloride, acrylonitrile, methacrylic acid, methacrylic acid ester, styrene, butadiene, ethylene, vinyl butyral, vinyl acetal or vinyl ether; polyurethane resins and various rubber resins. The examples of thermosetting resins and reactive resins include phenolic resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. These resins are described in detail in *Plastic Handbook*, Asakura Shoten. It is also possible to use well-known electron beam-curable type resins in each layer. The examples of these resins and producing methods of these resins are disclosed in detail in JP-A-62-256219. These resins can be used alone or may be used in combination. The examples of preferred combinations include combinations of at least one resin selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of any of these resins with polyisocyanate.

As the polyurethane resins, those having well-known structures, e.g., polyester polyurethane, polyether polyurethane, polyether polyester polyurethane, polycarbonate polyurethane, polyester polycarbonate polyurethane, and polycaprolactone polyurethane can be used. For the purpose of further improving the dispersibility and the durability, it is referred that at least one polar group selected from the following groups is introduced by copolymerization or addition reaction, with respect to all of the above binders, e.g., —COOM, —SO$_3$M, —OSO$_3$M, —P=O(OM)$_2$, —O—P=O(OM)$_2$ (wherein M represents a hydrogen atom or an alkali metal salt group), —NR$_2$, —N$^+$R$_3$ (R represents a hydrocarbon group), an epoxy group, —SH, or —CN. The content of the polar group is from $10^{-1}$ to $10^{-8}$ mol/g, preferably from $10^{-2}$ to $10^{-6}$ mol/g. It is preferred that polyurethane resins have at least one OH group at each terminal of a polyurethane molecule, i.e., two or more in total, besides the above polar groups. As OH groups form three dimensional network structure by crosslinking with a polyisocyanate curing agent, they are preferably contained in a molecule as many as possible. In particular, it is preferred that OH groups are present at terminals of a molecule, since the reactivity with the curing agent becomes high. It is preferred for polyurethane to have 3 or more OH groups, particularly preferably 4 or more OH groups, at terminals of a molecule. When polyurethane is used in the present invention, the polyurethane has a glass transition temperature of generally from −50 to 150° C., preferably from 0 to 100° C., and particularly preferably from 30 to 100° C., breaking extension of from 100 to 2,000%, breaking stress of generally from 0.05 to 10 kg/mm$^2$ (=about 0.49 to 98 MPa), and a yielding point of from 0.05 to 10 kg/mm$^2$ (=about 0.49 to 98 MPa). Due to these physical properties, a coated film having good mechanical properties can be obtained.

The specific examples of the binders for use in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.) as vinyl chloride copolymers; Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink. Co., Ltd.), Vylon UR8200, UR8300, UR8700, RV530 and RV280 (manufactured by Toyobo Co., Ltd.), polycarbonate polyurethane, Daipheramine 4020, 5020, 5100, 5300, 9020, 9022 and 7020 (manufactured by Dainichi Seika K.K.), polyurethane, MX5004 (manufactured by Mitsubishi Kasei Corp.), polyurethane, Sunprene SP-150 (manufactured by Sanyo Chemical Industries Co. Ltd.), polyurethane, Salan F310 and F210 (manufactured by Asahi Chemical Industry Co., Ltd.) as polyurethane resins, etc.

The amount of the binder for use in the nonmagnetic layer and the magnetic layer according to the present invention is from 5 to 50 mass % (i.e., weight %), preferably from 10 to 30 mass %, based on the mass (i.e., weight) of the nonmagnetic inorganic powder and the hexagonal ferrite powder respectively. When vinyl chloride resins are used, the amount is from 5 to 30 mass %, when polyurethane resins are used, the amount is from 2 to 20 mass %, and when polyisocyanates are used, the amount is from 2 to 20 mass %, and it is preferred to use these resins in combination, however, for instance, when the corrosion of a head is caused by a slight amount of chlorine due to dechlorination, it is possible to use polyurethane alone or a combination of polyurethane and isocyanate alone.

The magnetic recording medium in the present invention can comprise two or more layers, accordingly, the amount of the binder, the amounts of the vinyl chloride resin, polyurethane resin, polyisocyanate or other resins contained in the binder, the molecular weight of each resin constituting the magnetic layer, the amount of polar groups, or the above-described physical properties of resins can of course be varied in the nonmagnetic layer and the magnetic layer, according to necessity. These factors should be rather optimized in each layer. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against the head, it is effective to increase the amount of the binder in the nonmagnetic layer to give flexibility to the nonmagnetic layer.

The examples of the polyisocyanates for use in the present invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more in each layer taking the advantage of a difference in curing reactivity.

Carbon Black, Abrasive

The examples of carbon blacks for use in the magnetic layer according to the present invention include furnace blacks for rubbers, thermal blacks for rubbers, carbon blacks for coloring and acetylene blacks. Carbon blacks for use in the magnetic layer of the present invention preferably have a specific surface area ($S_{BET}$) of from 5 to 500 m²/g, a DBP oil absorption of from 10 to 400 ml/100 g, an average particle size of from 5 to 300 nm, pH of from 2 to 10, a water content of from 0.1 to 10%, and a tap density of from 0.1 to 1 g/ml. The specific examples of carbon blacks for use in the magnetic layer of the present invention include BLACKPEARLS 2000, 1300, 1000, 900, 905, 800 and 700, and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Kasei Corp.), CONDUCTEX SC, RAVEN 150, 50, 40 and 15, and RAVEN-MT-P (manufactured by Columbia Carbon Co., Ltd.), and Ketjen Black EC (manufactured by Lion-Akzo Co., Ltd.). Carbon blacks for use in the present invention may be surface-treated with a dispersant, may be grafted with a resin, or a part of the surface thereof may be graphitized before use. Carbon blacks may be previously dispersed in a binder before addition to the magnetic coating solution. These carbon blacks may be used alone or in combination. Carbon blacks are preferably used in an amount of from 0.1 to 30% based on the amount of the magnetic powder. Carbon blacks can serve various functions such as preventing static charges, reducing a friction coefficient, imparting a light-shielding property and improving a film strength, and such functions vary depending upon the kind of carbon blacks to be used. Accordingly, it is of course possible in the present invention to select and determine the kinds, the amounts and the combinations of the carbon blacks to be added to the upper magnetic layer and the lower layer, on the basis of the above described various properties such as the particle size, the oil absorption amount, the electroconductivity and the pH value, or these should be rather optimized in each layer. Regarding carbon blacks for use in the magnetic layer of the present invention, for example, the description in Handbook of Carbon Blacks (edited by Carbon Black Association of Japan) and WO 98/35345 can be referred to.

It is preferred to use an abrasive in the magnetic layer according to the present invention. As the abrasive, well-known materials essentially having a Mohs' hardness of 6 or more may be used alone or in combination, e.g., alpha-alumina having an alpha-conversion rate of 90% or more, beta-alumina, diamond, silicon carbide, chromium oxide, cerium oxide, alpha-iron oxide, corundum, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be obtained so far as the content of the main component is 90% or more. These abrasives preferably have a particle size of from 0.01 to 2 $\mu$m and, in particular, for improving electromagnetic characteristics, abrasives having narrow particle size distribution are preferred. Further, for improving durability, a plurality of abrasives each having a different particle size may be combined according to necessity, or a single abrasive having a broad particle size distribution may be employed so as to attain the same effect as such a combination. Preferably, abrasives for use in the present invention have a tap density of from 0.3 to 2 g/ml, a water content of from 0.1 to 5%, a pH value of from 2 to 11, and a specific surface area ($S_{BET}$) of from 1 to 30 m²/g. The shape of the abrasives to be used in the present invention may be any of acicular, spherical and die-like shapes. Abrasives having a shape partly with edges are preferred, because a high abrasive property can be given. The specific examples of the abrasives for use in the present invention include AKP-12, AKP-15, AKP-20, AKP-30, AKP-50, HIT-20, HIT-30, HIT- 55, HIT-60, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenma K.K.), UB20 (manufactured by Uemura Kogyo K.K.), G-5, Kromex U2 and Kromex U1 (manufactured by Nippon Chemical Industrial Co., Ltd.), TF100 and TF140 (manufactured by Toda Kogyo Co., Ltd.), beta-Random Ultrafine (manufactured by Ibiden Co., Ltd.), and B-3 (manufactured by Showa Mining Co., Ltd.).

These abrasives may also be added to a nonmagnetic layer, if necessary. By adding abrasives into a nonmagnetic layer, it is possible to control the surface shape or prevent abrasives from protruding. The particle sizes and amounts of abrasives to be added to a magnetic layer and a nonmagnetic layer should be selected independently at optimal values.

Additives

As the additives for use in the magnetic layer and the nonmagnetic layer of the present invention, those having a lubricating effect, an antistatic effect, a dispersing effect and a plasticizing effect are used, and by combining the additives, comprehensive improvement of capacities can be contrived. As the additives having a lubricating effect, lubricants giving remarkable action on cohesion caused by the friction of surfaces of materials with each other are used. Lubricants are classified into two types. Lubricants which are used for a magnetic recording medium cannot be judged completely whether they show fluid lubrication or boundary lubrication, but according to general concepts they are classified into higher fatty acid esters, liquid paraffins and silicon derivatives which show fluid lubrication, and long chain fatty acids, fluorine surfactants and fluorine-containing high polymers which show boundary lubrication. In a coating type magnetic recording medium, a lubricant exists in a state dispersed in a binder or in a state partly adsorbed onto the surface of hexagonal ferrite powder, and the lubricant migrates to the surface of a magnetic layer. The speed of migration depends upon whether the compatibility of the binder and the lubricant is good or bad. The speed of migration is slow when the compatibility of the binder and the lubricant is good and the migration speed is fast when the compatibility is bad. As one idea as to good or bad of the compatibility, there is a means of comparison of dissolution parameters of the binder and the lubricant. A nonpolar lubricant is effective for fluid lubrication and a polar lubricant is effective for boundary lubrication.

In the present invention, it is preferred to use a higher fatty acid ester showing fluid lubrication and a long chain fatty acid showing boundary lubrication each having different characteristics in combination, and it is more preferred to combine at least three of these lubricants. Solid lubricants can also be used in combination with them.

The examples of the solid lubricants which can be used in the present invention include molybdenum disulfide, tungsten graphite disulfide, boron nitride, and graphite fluoride. The examples of the long chain fatty acids showing boundary lubrication include monobasic fatty acids having from 10 to 24 carbon atoms (which may contain an unsaturated bond or may be branched) and metal salt of these monobasic fatty acids (e.g., with Li, Na, K or Cu). The examples of the fluorine surfactants and fluorine-containing high polymers include fluorine-containing silicones, fluorine-containing alcohols, fluorine-containing esters, fluorine-containing alkyl sulfates and alkali metal salts of them. The examples of the higher fatty acid esters showing fluid lubrication include basic fatty acid monoesters, fatty acid diesters or fatty acid triesters composed of a monobasic fatty acid having from 10 to 24 carbon atoms (which may contain an unsaturated bond or may be branched) and anyone of mono-, di-, tri-, tetra-, penta- and hexa-alcohols having from 2 to 12 carbon atoms (which may contain an unsaturated bond or may be branched), and fatty acid esters of monoalkyl ethers of alkylene oxide polymers. In addition to the above, the examples further include liquid paraffins, and as the silicon derivatives, silicone oils, e.g., dialkylpolysiloxane (the alkyl group has from 1 to 5 carbon atoms), dialkoxypolysiloxane (the alkoxy group has from 1 to 4 carbon atoms), monoalkylmonoalkoxypolysiloxane (the alkyl group has from 1 to 5 carbon atoms and the alkoxy group has from 1 to 4 carbon atoms), phenylpolysiloxane, and fluoroalkylpolysiloxane (the alkyl group has from 1 to 5 carbon atoms), silicones having a polar group, fatty acid-modified silicones, and fluorine-containing silicones.

The examples of other lubricants which can be used in the present invention include alcohols such as mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), and fluorine-containing alcohols, polyethylene waxes, polyolefins such as polypropylenes, ethylene glycols, polyglycols such as polyethylene oxide waxes, alkyl phosphates and alkali metal salts of alkyl phosphates, alkyl sulfates and alkali metal salts of alkyl sulfates, polyphenyl ethers, fatty acid amides having from 8 to 22 carbon atoms, and aliphatic amines having from 8 to 22 carbon atoms.

The examples of the additives having an antistatic effect, a dispersing effect and a plasticizing effect which can be used in the present invention include phenylphosphonic acids, specifically "PPA" (manufactured by Nissan Chemical Industries, Ltd.), etc., alpha-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metal salts thereof.

The lubricants particularly preferably used in the present invention are fatty acids and fatty acid esters, and the specific examples of the lubricants are disclosed in WO 98/35345. Besides the above, other different lubricants and additives can be used in combination as well.

Additionally, nonionic surfactants, e.g., alkylene oxides, glycerols, glycidols and alkylphenol-ethylene oxide adducts; cationic surfactants, e.g., cyclic amines, ester amides, quaternary ammonium salts, hydantoin derivatives, heterocyclic compounds, phosphoniums and sulfoniums; anionic surfactants containing an acidic group, e.g., carboxylic acid, sulfonic acid, phosphoric acid, sulfuric acid ester groups or phosphoric acid ester groups; and amphoteric surfactants, e.g., amino acids, aminosulfonic acids, sulfates or phosphates of amino alcohols, and alkylbetains can also be used. The details of these surfactants are described in *Kaimen Kasseizai Binran* (*Handbook of Surfactants*) (published by Sangyo Tosho Co., Ltd.). These lubricants and antistatic agents may not always be 100% pure and may contain impurities such as isomers, non-reacted products, byproducts, decomposed products and oxides, in addition to the main component. However, the content of such impurities is preferably 30% or less, more preferably 10% or less.

As described in WO 98/35345, it is also preferred to use a monoester and a diester in combination as the fatty acid ester.

The surface of the magnetic layer of the magnetic recording medium in the present invention, in particular, the disc-like magnetic recording medium, has a C/Fe peak ratio of preferably from 5 to 100, particularly preferably from 5 to 80 when measured by the Auger electron spectroscopy. The measuring condition of the C/Fe peak ratio by the Auger electron spectroscopy is as follows.

Apparatus: Model PHI-660 manufactured by Φ Co.
Measuring condition:
Primary electron beam accelerating voltage: 3 KV
Electric current of sample: 130 nA
Magnification: 250-fold
Inclination angle: 30°

The value of C/Fe peak ratio is obtained as the C/Fe ratio by integrating the region of kinetic energy of 130 eV to 730 eV three times under the above conditions and finding the strengths of KLL peak of the carbon and LMM peak of the iron as differentials.

The amount of the lubricants contained in each of the upper layer and the lower layer of the magnetic recording medium according to the present invention is from 5 to 30 mass parts per 100 mass parts of the hexagonal ferrite powder or nonmagnetic inorganic powder.

The lubricants and surfactants for use in the present invention have individually different physical functions. The kinds, amounts and proportions of generating synergistic effect of these lubricants should be determined optimally in accordance with the purpose. The nonmagnetic layer and the magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amount of the surfactant is controlled so as to improve the coating stability, or the amount of the lubricant in the intermediate layer is made larger so as to improve the lubricating effect. The examples are by no means limited thereto. In general, the total amount of the lubricants is from 0.1 to 50 mass %, preferably from 2 to 25 mass %, based on the amount of the hexagonal ferrite powder or the nonmagnetic powder.

All or a part of the additives to be used in the present invention may be added to the magnetic coating solution or the nonmagnetic coating solution in any step of the preparation. For example, the additives may be blended with the magnetic powder before the kneading step, may be added in the step of kneading the magnetic powder, the binder and the solvent, may be added in the dispersing step, maybe added after the dispersing step, or may be added just before coating. According to the purpose, there is the case of capable of attaining the object by coating all or a part of the additives simultaneously with or successively after the coating of the magnetic layer. According to the purpose, the lubricants may be coated on the surface of the magnetic layer after the calendering treatment or after the completion of slitting.

Well-known organic solvents can be used in the present invention, e.g., the organic solvents disclosed in JP-A-6-68453 can be used.

Layer Structure

The thickness of the support of the magnetic recording medium in the present invention is generally from 2 to 100 µm, preferably from 2 to 80 µm. The thickness of the support of a computer tape is from 3.0 to 6.5 µm, preferably from 3.0 to 6.0 µm, and more preferably from 4.0 to 5.5 µm.

An undercoating layer may be provided between the support, preferably the nonmagnetic flexible support, and the nonmagnetic or magnetic layer for adhesion improvement. The thickness of the undercoating layer is from 0.01 to 0.5 µm, preferably from 0.02 to 0.5 µm.

A backing layer may be provided on the support opposite to the side having the magnetic layer for the purpose of providing static charge prevention and curling correction. The thickness of the backing layer is generally from 0.1 to 4 µm, preferably from 0.3 to 2.0 µm. Well-known undercoating layers and backing layers can be used for this purpose.

The thickness of the magnetic layer in the present invention is as described above and is optimized according to the saturation magnetization amount of the head to be used, the head gap length, and the recording signal zone. When a lower layer is provided, the thickness of the lower layer is generally from 0.2 to 5.0 µm, preferably from 0.3 to 3.0 µm, and more preferably from 1.0 to 2.5 µm. The lower layer exhibits the effect of the present invention so long as it is substantially a nonmagnetic layer, and the lower layer may contain a small amount of a magnetic powder as an impurity, or may contain intentionally a small amount of a magnetic powder. The term "substantially a nonmagnetic layer" means that the residual magnetic flux density of the lower layer is 100 mT or less or the coercive force of the lower layer is 100 Oe (=about 8 kA/m) or less, preferably the residual magnetic flux density and the coercive force are zero. Further, when the lower layer contains a magnetic powder, the content of the magnetic layer is preferably less than ½ of the entire inorganic powder contained in the lower layer. Further, a soft magnetic layer containing a soft magnetic powder and a binder may be formed.

Backing Layer

The magnetic recording medium according to the present invention can be provided with a backing layer. A magnetic disc may also be provided with a backing layer, however, in general, a magnetic tape for a computer data recording is decidedly required to have an excellent repeating-running property as compared with a video tape and an audio tape. It is preferred for a backing layer to contain a carbon black and an inorganic powder for maintaining such a high running durability.

It is preferred to use two kinds of carbon blacks each having different average particle size in combination. In such a case, a fine carbon black having an average particle size of from 10 to 20 nm and a coarse carbon black having an average particle size of from 230 to 300 nm are preferably used in combination. In general, by the addition of a fine carbon black as above, the surface electrical resistance of a backing layer can be set at a low value and light transmittance can also be set at a low value. Since there are many kinds of magnetic recording apparatus making use of light transmittance of a tape to make it as a signal of operation, addition of fine carbon blacks is particularly effective in such a case. Further, fine carbon blacks are in general excellent in retention of a liquid lubricant and contribute to the reduction of a friction coefficient when lubricants are used in combination. On the other hand, coarse carbon blacks having an average particle size of from 230 to 300 nm have a function as a solid lubricant and form minute protrusions on the surface of a backing layer to reduce the contact area and contribute to the reduction of a friction coefficient.

When commercially available products are used as the fine carbon blacks and coarse carbon blacks which can be used in the present invention, those disclosed in WO 98/35345 can be exemplified as the specific examples.

When two kinds of carbon blacks each having different average particle size are used in combination in a backing layer, the proportion of the contents (by mass (i.e., by weight)) of a fine carbon black having a particle size of from 10 to 20 nm and a coarse carbon black having a particle size of from 230 to 300 nm is preferably the former/the latter of from 98/2 to 75/25, more preferably from 95/5 to 85/15.

The content of the carbon black in a backing layer (the total amount when two kinds of carbon blacks are used) is generally from 30 to 80 mass parts (i.e., weight parts), preferably from 45 to 65 mass parts, per 100 mass parts of the binder.

It is preferred to use two kinds of inorganic powders each having different hardness.

Specifically, a soft inorganic powder having a Mohs' hardness of from 3 to 4.5 and a hard inorganic powder having a Mohs' hardness of from 5 to 9 are preferably used in combination.

By the addition of a soft inorganic powder having a Mohs' hardness of from 3 to 4.5, a friction coefficient can be stabilized against repeating-running. Moreover, a sliding guide pole is not scratched off with the hardness within this range. The average particle size of such a soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more.

The content of the soft inorganic powder in a backing layer is preferably from 10 to 140 mass parts, more preferably from 35 to 100 mass parts, per 100 mass parts of the carbon black.

By the addition of a hard inorganic powder having a Mohs' hardness of from 5 to 9, the strength of a backing layer is increased and running durability is improved. When such hard inorganic powders are used together with carbon blacks and the above soft inorganic powders, deterioration due to repeating sliding is reduced and a strong backing layer can be obtained. Appropriate abrasive property is given to the backing layer by the addition of the hard inorganic powder and the adhesion of scratched powders to a tape guide pole is reduced. In particular, when the hard inorganic powder is used in combination with a soft inorganic powder, sliding characteristics against a guide pole having a rough surface is improved and the stabilization of a friction coefficient of the backing layer can also be brought about.

The average particle size of the hard inorganic powders is preferably from 80 to 250 nm, more preferably from 100 to 210 nm.

The examples of the hard inorganic powders having a Mohs' hardness of from 5 to 9 include, e.g., alpha-iron oxide, alpha-alumina, and chromium oxide ($Cr_2O_3$). These powders may be used alone or in combination. Of the above hard inorganic powders, alpha-iron oxide and alpha-alumina are preferred. The content of the hard inorganic powder in the backing layer is generally from 3 to 30 mass parts, preferably from 3 to 20 mass parts, per 100 mass parts of the carbon black.

When the above soft inorganic powder and hard inorganic powder are used in combination in the backing layer, it is preferred to use them selectively so that the difference of hardness between the soft and hard inorganic powders is 2 or more, more preferably 2.5 or more, and particularly preferably 3 or more.

It is preferred that the above-described two kinds of inorganic powders each having a specific average particle size and different in Mohs' hardness and the above-described two kinds of carbon blacks each having a different average particle size are contained in the backing layer.

The backing layer may contain a lubricant. The lubricant can be arbitrarily selected from among those which can be used in the magnetic layer or the nonmagnetic layer as described above. The content of the lubricant in the backing layer is generally from 1 to 5 mass parts per 100 mass parts of the binder.

Support

The support for use in the present invention is preferably a nonmagnetic flexible support, and has a thermal shrinkage factor of preferably 0.5% or less at 100° C. for 30 minutes in every direction of in-plane of the support, and has a thermal shrinkage factor of preferably 0.5% or less at 80° C. for 30 minutes, more preferably 0.2% or less. Moreover, the above-described thermal shrinkage factors of the support at 100° C. for 30 minutes and at 80° C. for 30 minutes are preferably almost equal in every direction of in-plane of the support with difference of not more than 10%. The support is preferably a nonmagnetic support. As the nonmagnetic support for use in the present invention, well-known films, such as polyesters (e.g., polyethylene terephthalate and polyethylene naphthalate), polyolefins, cellulose triacetate, polycarbonate, aromatic or aliphatic polyamide, polyimide, polyamideimide, polysulfone, polyaramide, and polybenzoxazole can be used. Highly strong supports such as polyethylene naphthalate and polyamide are preferably used. If necessary, a lamination type support as disclosed in JP-A-3-224127 can be used to vary the surface roughnesses of the magnetic layer surface and the base surface. The support may be previously subjected to surface treatments, such as corona discharge treatment, plasma treatment, easy adhesion treatment, heat treatment, and dust removing treatment. Aluminum or glass substrate can also be used as a support in the present invention.

For attaining the object of the present invention, it is preferred to use a support having a central plane average surface roughness (Ra) of generally 8.0 nm or less, preferably 4.0 nm or less, and more preferably 2.0 nm or less, measured by a surface roughness meter TOPO-3D (a product of WYKO Co.). It is preferred that the support not only has a small central plane average surface roughness but also is free from coarse protrusions having a height of 0.5 $\mu$m or more. Surface roughness configuration is freely controlled by the size and the amount of the fillers added to the support according to necessity. The examples of such fillers include acryl-based organic powders, as well as oxides or carbonates of Ca, Si and Ti. The support for use in the present invention preferably has the maximum height (Rmax) of 1 $\mu$m or less, ten point average roughness (Rz) of 0.5 $\mu$m or less, central plane peak height (Rp) of 0.5 $\mu$m or less, central plane valley depth (Rv) of 0.5 $\mu$m or less, central plane area factor (Sr) of from 10% to 90%, and average wavelength ($\lambda$a) of from 5 $\mu$m to 300 $\mu$m. For obtaining desired electromagnetic characteristics and durability, surface protrusion distribution of the support can be controlled arbitrarily by fillers, e.g., the number of protrusions having sizes of from 0.01 $\mu$m to 1 $\mu$m can be controlled each within the range of from 0 to 2,000 per 0.1 $mm^2$.

The F-5 value of the support for use in the present invention is preferably from 5 to 50 $kg/mm^2$ (=about 49 to 490 MPa), the thermal shrinkage factor of the support at 100° C. for 30 minutes is preferably 3% or less, more preferably 1.5% or less, and the thermal shrinkage factor at 80° C. for 30 minutes is preferably 0.5% or less, more preferably 0.1% or less. The support has a breaking strength of from 5 to 100 kg/mm$^2$ (=about 49 to 980 MPa), an elastic modulus of from 100 to 2,000 kg/mm$^2$ (=about 0.98 to 19.6 GPa), a temperature expansion coefficient of from $10^{-4}$ to $10^{-8}$/° C., preferably from $10^{-5}$ to $10^{-6}$/° C., and a humidity expansion coefficient of $10^{-4}$/RH % or less, preferably $10^{-5}$/RH % or less. These thermal characteristics, dimensional characteristics and mechanical strength characteristics are preferably almost equal in every direction of in-plane of the support with difference of not more than 10%.

Producing Method

Production process of the magnetic coating solution of the magnetic recording medium of the present invention comprises at least a kneading process, a dispersing process and, optionally, a blending process to be carried out before and/or after the kneading and dispersing processes according to necessity. Each process may consist of two or more separate stages. Materials such as a magnetic powder, a nonmagnetic powder, a binder, a carbon black, an abrasive, an antistatic agent, a lubricant, a solvent, and the like for use in the present invention may be added at any step at any time. Each material may be added at two or more processes in parts. For example, polyurethane can be added in parts at a kneading process, a dispersing process, or a blending process for adjusting viscosity after dispersion. For achieving the object of the present invention, a conventionally well-known producing technique can be performed as a part of the above processes. Powerful kneading machines such as an open kneader, a continuous kneader, a pressure kneader and an extruder are preferably used in a kneading process. When a kneader is used, all or a part of the binder (preferably 30% or more of the total binders) is kneading-treated together with a magnetic powder or a nonmagnetic powder in the range of from 15 to 500 parts per 100 parts of the magnetic powder or nonmagnetic powder. Details of this kneading process are disclosed in JP-A-1-106338 and JP-A-1-79274. Glass beads can be used for dispersing a magnetic layer solution and a nonmagnetic layer solution, and dispersing media having a high specific gravity, e.g., zirconia beads, titania beads and steel beads are suitable for this purpose. Optimal particle size and packing density of these dispersing media should be selected. Well-known dispersing apparatus can be used in the present invention.

The following methods are preferably used for coating the magnetic recording medium having a multilayer structure in the present invention. As the first method, the lower layer is coated by any of gravure coating, roll coating, blade coating, and extrusion coating apparatus, which are generally used in the coating of a magnetic coating solution, and the upper layer is coated while the lower layer is still wet by means of a support pressing type extrusion coating apparatus disclosed in JP-B-1-46186, JP-A-60-238179 and JP-A-2-265672. As the second method, the upper layer and the lower layer are coated almost simultaneously using a coating head equipped with two slits for feeding a coating solution as disclosed in JP-A-63-88080, JP-A-2-17971 and JP-A-2-265672. As the third method, the upper layer and the lower layer are coated almost simultaneously using an extrusion coating apparatus equipped with a backup roll as disclosed in JP-A-2-174965. For preventing the deterioration of the electromagnetic characteristics of the magnetic recording medium due to agglomeration of magnetic powders, it is preferred to impart shear to the coating solution in a coating head by the methods as described in JP-A-62-95174 and JP-A-1-236968. With respect to the viscosity of the coating solution, the range of the numeric values disclosed in JP-A-3-8471 is necessary to be satisfied. For realizing the constitution of the present invention, a successive multilayer coating method comprising the steps of coating and drying the lower layer, and then coating the magnetic layer on the lower layer can of course be used without impairing the effect of the present invention. However, for reducing coating defects and improving quality, e.g., free of dropout, it is preferred to use the above simultaneous multilayer coating method.

In the case of a magnetic disc, isotropic orienting property can be sufficiently obtained in some cases without performing orientation using orientating apparatus, but it is preferred to use well-known random orientation apparatuses, to thereby dispose cobalt magnets diagonally and alternately or apply an alternating current magnetic field using a solenoid. Hexagonal ferrites in general have an inclination for three dimensional random orientation of in-plane and in the perpendicular direction but it is also possible to make in-plane two dimensional random orientation. Further, it is also possible to impart isotropic magnetic characteristics in the circumferential direction by perpendicular orientation using well-known methods, e.g., using different pole and counter position magnets. Perpendicular orientation is particularly preferred when the disc is used in high density recording. Circumferential orientation can be conducted using spin coating.

In the case of a magnetic tape, orientation is performed in the machine direction using a cobalt magnet and a solenoid. In orientation, it is preferred that the drying position of the coated film can be controlled by controlling the temperature and the amount of drying air and coating velocity. Coating velocity is preferably from 20 to 1,000 m/min. and the temperature of drying air is preferably 60° C. or higher. Appropriate preliminary drying can be performed before entering the magnet zone.

Use of heat resisting plastic rolls such as epoxy, polyimide, polyamide and polyimideamide, or metal rolls is effective for calendering treatment. It is preferred to use metal rolls for the treatment particularly when magnetic layers are coated on both surfaces of a support. The treatment temperature is preferably 50° C. or more, more preferably 100° C. or more. The linear pressure is preferably 200 kg/cm (=about 196 kN/m) or more, more preferably 300 kg/cm (=about 294 kN/m) or more.

After calendering treatment, a magnetic recording medium is punched or cut to a desired form. After being punched as a disc-like shape as required, after-treatments such as a thermal treatment by high temperature (generally from 50 to 90° C.) to accelerate curing of the coated layer, and a burnishing treatment with an abrasive tape can be carried out. In the case of a magnetic tape, the surface of the magnetic layer of the tape can be cleaned with a tape cleaning apparatus having delivery and winding-up movement of a slit product to which a nonwoven fabric and a razor blade are attached so as to be pressed against the surface of the tape.

Physical Properties

Saturation magnetic flux density of the magnetic layer of the magnetic recording medium according to the present invention is preferably from 100 to 300 mT. The coercive force (Hc) is preferably from 1,800 to 5,000 Oe (=about 144 to 400 kA/m), more preferably from 1,800 to 3,000 Oe (=about 144 to 240 kA/m). The distribution of the coercive force is preferably narrow, and SFD (switching field distribution) and SFDr are preferably 0.6 or less.

The friction coefficient of the magnetic recording medium according to the present invention against a head at temperature of −10° C. to 40° C. and humidity of 0% to 95% is generally 0.5 or less, preferably 0.3 or less, the surface intrinsic resistivity of the magnetic surface is preferably from $10^4$ to $10^{12}$ Ω/sq, the charge potential is preferably from −500 V to +500 V, the elastic modulus at 0.5% elongation of the magnetic layer is preferably from 100 to 2,000 kg/mm² (=about 980 to 19,600 N/mm²) in every direction of in-plane, the breaking strength is preferably from 10 to 70 kg/mm² (=about 98 to 686 N/mm²), the elastic modulus of the magnetic recording medium is preferably from 100 to 1,500 kg/mm² (=about 980 to 14,700 N/mm²) in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of the magnetic layer (the maximum of elastic modulus loss by dynamic viscoelasticity measurement at 110 Hz) is preferably from 50° C. to 120° C., and that of the lower layer is preferably from 0° C. to 100° C. The loss elastic modulus is preferably within the range of from $1\times10^3$ to $8\times10^4$ N/cm², and loss tangent is preferably 0.2 or less. If loss tangent is too large, adhesion failure is liable to occur. These thermal characteristics and mechanical characteristics are preferably almost equal in every direction of in-plane of the medium with difference of not more than 10%. The residual amount of the solvent in the magnetic layer is preferably 100 mg/m² or less, more preferably 10 mg/m² or less. The void ratio of the coated layer is preferably 30% by volume or less, more preferably 20% by volume or less, with both of the lower layer and the upper layer. The void ratio is preferably smaller for obtaining high output but it is preferred in some cases to secure a specific value depending on purposes. For example, in a disc-like medium which is repeatedly used, large void ratio contributes to good running durability in many cases.

The magnetic layer for use in the present invention preferably has the maximum height (Rmax) of 0.5 μm or less, ten point average roughness (Rz) of 0.3 μm or less, central plane peak height (Rp) of 0.3 μm or less, central plane valley depth (Rv) of 0.3 μm or less, central plane area factor (Sr) of from 20% to 80%, and average wavelength (λa) of from 5 μm to 300 μm. For obtaining desired electromagnetic characteristics and a friction coefficient, a number of surface protrusions of the magnetic layer of sizes of from 0.01 μm to 1 μm can be controlled arbitrarily within the range of from 0 to 2,000 by controlling the surface property by fillers in the support, the particle size and the amount of the magnetic powders added to the magnetic layer, or by the surface shapes of the rolls of calender treatment. The range of curling is preferably within ±3 mm. It can be easily presumed that these physical properties of the magnetic recording medium in the present invention can be varied according to purposes in the lower layer and the upper layer in the case of multilayer structure. For example, the elastic modulus of the upper layer is made higher to improve running durability and at the same time the elastic modulus of the lower layer is made lower than that of the upper layer to improve the head touching of the magnetic recording medium.

EXAMPLE

The present invention will be described in detail below with reference to specific examples, but the present invention should not be construed as being limited thereto. In the examples, "part" means "mass part (weight parts)" unless otherwise indicated.

Examples 1 to 10 and Comparative Examples 1 to 8

| Preparation of Coating Solution | |
|---|---|
| Magnetic layer coating solution | |
| Magnetic powder (BaFe, average tabular diameter: see Table 1, tabular ratio: 3) | 100 parts |
| Vinyl chloride copolymer MR110 (manufactured by Nippon Zeon Co., Ltd.) | 5 parts |
| Polyurethane resin UR 8200 (manufactured by Toyobo Co., Ltd.) | 3 parts |
| alpha-Alumina HIT55 (manufactured by Sumitomo Chemical Co., Ltd.) | 10 parts |
| Carbon black #50 (manufactured by Asahi Carbon Co., Ltd.) | 1 part |
| Phenylphosphonic acid | 2 parts |
| Butyl stearate | |
| disc: | 10 parts, |
| tape: | 1 part |
| Butoxyethyl stearate | |
| disc: | 5 parts, |
| tape: | 1 part |
| Isohexadecyl stearate | |
| disc: | 3 parts, |
| tape: | 1 part |
| Stearic acid | 2 parts |
| Methyl ethyl ketone | 125 parts |
| Cyclohexanone | 125 parts |

| Lower layer coating solution | |
|---|---|
| Nonmagnetic powder, TiO₂, crystal system rutile Average primary particle size: 0.035 μm Specific surface area ($S_{BET}$): 40 m²/g pH: 7 TiO₂ content: 90% or more DBP oil absorption: 27 to 38 ml/100 g Surface-covering compound: treatment with 8 wt % of Al₂O₃ | 80 parts |
| Carbon black CONDUCTEX SC-U (manufactured by Columbia Carbon Co., Ltd.) | 20 parts |
| MR110 | 12 parts |
| UR 8200 | 5 parts |
| Stearic acid | 3 parts |
| Butyl stearate | |
| disc: | 10 parts, |
| tape | 1 part |
| Butoxyethyl stearate | |
| disc: | 5 parts, |
| tape | 1 part |
| Isohexadecyl stearate | |
| disc: | 3 parts, |
| tape | 1 part |
| Methyl ethyl ketone/cyclohexanone (8/2 mixed solvent) | 250 parts |

Production of Disc

The components of each of the above compositions of the magnetic layer coating solution and the lower layer coating solution were blended in a kneader, respectively, then dispersed with a sand mill. The thus-obtained each dispersion solution was filtered through a filter having an average pore diameter of 1 μm, to thereby obtain coating solutions for forming the magnetic layer and the lower layer, respectively.

Single Layer Coating

The magnetic layer coating solution was coated on a polyethylene terephthalate support having a thickness of 62 μm and a central line average surface roughness of 3 nm at a coating velocity of 100 m/min so as to reach a prescribed magnetic layer thickness (shown in Table 1). While the coated magnetic layer was still wet, the layer was subjected to orientation in the machine direction with a 0.6T Co magnet, and then to random orientation by passing through an alternating current magnetic field generator having magnetic field intensity of 25 mT. After drying, the magnetic layer was subjected to calendering treatment with calenders of 7 stages at 90° C. at line pressure of 300 kg/cm (294 kN/m). The obtained web was punched to a disc of 3.7 inches, the disc underwent surface treatment by an abrasive, encased in 3.7 inch cartridge having a liner inside (a zip-disc cartridge manufactured by Iomega Co., U.S.A.), and equipped the cartridge with prescribed mechanism parts, to thereby obtain a 3.7 inch floppy disc.

Simultaneous Multilayer Coating

The lower layer coating solution and the magnetic layer coating solution were simultaneously multilayer-coated on a polyethylene terephthalate support having a thickness of 62 μm and a central line average surface roughness of 3 nm. The lower layer coating solution was coated in a dry thickness of 1.5 μm, immediately thereafter the magnetic layer coating solution was coated on the lower layer so as to reach a prescribed thickness (shown in Table 1), thus a 3.7 inch floppy disc was obtained in the same manner as above.

Successive Multilayer Coating

The lower layer coating solution was coated in a dry thickness of 1.5 μm on a polyethylene terephthalate support having a thickness of 62 μm and a central line average surface roughness of 3 nm, and the coated layer was subjected to calendering treatment with calenders of 7 stages at 90° C. at line pressure of 300 kg/cm (294 kN/m). After that, the magnetic layer coating solution was coated on the lower layer so as to reach a prescribed thickness (shown in Table 1) and, while the coated magnetic layer was still wet, the layer was subjected to orientation in the machine direction with a 0.6T Co magnet, and then to random orientation by passing through an alternating current magnetic field generator having magnetic field intensity of 25 mT. The magnetic layer was subjected to calendering treatment with calenders of 7 stages at 90° C. at line pressure of 300 kg/cm (294 kN/m). The thus-obtained web was punched to a disc of 3.7 inches, and the disc underwent surface treatment by an abrasive, thereby a 3.7 inch floppy disc was obtained in the same manner as above.

Production of Tape

The components of each of the above compositions of the magnetic layer coating solution and the lower layer coating solution were blended in a kneader, respectively, then dispersed with a sand mill. The thus-obtained each dispersion solution was filtered through a filter having an average pore diameter of 1 μm, to thereby obtain coating solutions for forming the magnetic layer and the lower layer, respectively.

Single Layer Coating

The magnetic layer coating solution was coated on an aromatic polyamide support having a thickness of 4.4 μm and a central line average surface roughness of 3 nm so as to reach a prescribed magnetic layer thickness (shown in Table 1). The magnetic layer was subjected to orientation while still wet by passing through counter position magnets of 0.6T Co magnet and 0.6T solenoid magnet. After drying, the magnetic layer was subjected to calendering treatment with calenders of 7 stages at 90° C. at line pressure of 300 kg/cm (294 kN/m). The obtained web was slit into a strip of 3.8 mm in width, thereby a tape was obtained.

Simultaneous Multilayer Coating

The lower layer coating solution and the magnetic layer coating solution were simultaneously multilayer-coated on an aromatic polyamide support having a thickness of 4.4 μm and a central line average surface roughness of 3 nm. The lower layer coating solution was coated in a dry thickness of 1.5 μm, immediately thereafter the magnetic layer coating solution was coated on the lower layer so as to reach a prescribed thickness (shown in Table 1), thus a tape was obtained in the same manner as above.

Successive Multilayer Coating

The lower layer coating solution was coated in a dry thickness of 1.5 μm on an aromatic polyamide support having a thickness of 4.4 μm and a central line average surface roughness of 3 nm, and the coated layer was subjected to calendering treatment with calenders of 7 stages at 90° C. at line pressure of 300 kg/cm (294 kN/m). After that, the magnetic layer coating solution was coated on the lower layer so as to reach a prescribed thickness (shown in Table 1). The magnetic layer was subjected to calendering treatment with calenders of 7 stages at 90° C. at line pressure of 300 kg/cm (294 kN/m), thus a tape was obtained in the same manner as above.

Each of the above-obtained samples was evaluated as follows. The results obtained are shown in Table 1 below.

Magnetic Characteristics:

Perpendicular Factor of SQ

Perpendicular factor of SQ was measured using a vibrating sample magnetometer (a product of Toei Kogyo Co., Ltd.) at Hm 10 kOe (=about 796 kA/m) after demagnetizing compensation in the perpendicular direction to the magnetic face.

Specific Surface Area and Total Pore Volume Per Mass (i.e., Weight) of Magnetic Layer by a Nitrogen Adsorption Method Measurement was performed by a nitrogen adsorption method as described above.

Electromagnetic Characteristics

Measurement of S/N (the Case of Disc)

S/N ratio was measured using RAW1001 type disc evaluating apparatus (manufactured by GUZIK Co., U.S.A.), a spin stand LS-90 (manufactured by Kyodo Electron System Co., Ltd.), and a metal-in-gap head having a gap length of 0.3 μm. Recording of signals of line recording density 90 KFCI was performed at the position of radius of 24.6 mm, and the recorded signals were reproduced using an MR head for reproduction. S/N ratio was obtained from the noise level after DC erasure.

Measurement of C/N (the Case of Tape)

C/N ratio was measured by attaching a recording head (MIG, gap length: 0.15 μm, track width: 4 μm) and an MR head (shield gap: 0.2 μm track width: 4 μm) for reproduction to a drum tester. Single frequency signal was recorded and reproduced by head-medium relative speed of 10 m/sec and recording wavelength of 0.2 μm (50 MHz), and the ratio of the output voltage to the noise voltage 1 MHz off was taken as C/N ratio.

TABLE 1

| Sample | Average Tabular Size of Magnetic Powder (nm) | Perpendicular Factor of SQ | Magnetic Layer Thickness ($\mu$m) | Specific Surface Area ($m^2/g$) | Total Pore Volume (ml/g) | Layer Structure | Disc S/N (dB) | Tape C/N (dB) |
|---|---|---|---|---|---|---|---|---|
| Example 1 | 30 | 0.4 | 0.2 | 25 | 0.01 | single layer | 6 | 7 |
| Example 2 | 15 | 0.4 | 0.2 | 25 | 0.01 | single layer | 7 | 8 |
| Example 3 | 40 | 0.4 | 0.2 | 25 | 0.01 | single layer | 6 | 7 |
| Example 4 | 30 | 0.1 | 0.2 | 25 | 0.01 | single layer | 7.5 | 8.5 |
| Example 5 | 30 | 0.55 | 0.2 | 25 | 0.01 | single layer | 5.5 | 6.5 |
| Example 6 | 30 | 0.4 | 0.2 | 0.1 | 0.001 | single layer | 6 | 7 |
| Example 7 | 30 | 0.4 | 0.2 | 50 | 1 | single layer | 6.5 | 7.5 |
| Example 8 | 30 | 0.4 | 0.2 | 25 | 0.01 | multilayer (successive) | 10 | 11 |
| Example 9 | 30 | 0.4 | 0.2 | 25 | 0.01 | multilayer (simultaneous) | 9 | 10 |
| Example 10 | 30 | 0.4 | 0.3 | 25 | 0.01 | multilayer (simultaneous) | 8.5 | 9 |
| Comparative Example 1 | 10 | 0.4 | 0.2 | 25 | 0.01 | single layer | 0 | 0 |
| Comparative Example 2 | 50 | 0.4 | 0.2 | 25 | 0.01 | single layer | 0 | 0 |
| Comparative Example 3 | 30 | 0.60 | 0.2 | 25 | 0.01 | single layer | 0 | 0 |
| Comparative Example 4 | 30 | 0.4 | 0.2 | 60 | 2 | single layer | 0 | 0 |
| Comparative Example 5 | 30 | 0.4 | 0.2 | 0.050 | 0.00050 | single layer | −1 | −1 |
| Comparative Example 6 | 30 | 0.4 | 0.2 | 60 | 2 | multilayer (successive) | 1 | 1 |
| Comparative Example 7 | 30 | 0.4 | 0.2 | 60 | 2 | multilayer (simultaneous) | 1 | 1 |
| Comparative Example 8 | 30 | 0.4 | 0.4 | 25 | 0.01 | multilayer (simultaneous) | 2 | 2 |

The modes in Examples and Comparative Examples are as follows.

Examples 1, 8 and 9 were standards of a single layer, a successive multilayer and a simultaneous multilayer respectively.

Examples 1 to 7 and Comparative Examples 1 to 5 were single layers, and Examples 2 to 6 and Comparative Examples 1 to 5 were the modifications of Example 1 as shown below.

In Examples 2 and 3, the average tabular diameters of the magnetic powder were changed.

In Example 4, the disc was produced by changing the coating velocity from 100 m/min to 50 m/min, and random orientation was performed after orientation had been performed in the machine direction by putting ten bipolar counter position Co magnets of IT side by side.

In Example 4, the tape was produced at a coating velocity of 40 m/min, and orientation was performed in the machine direction by putting ten bipolar counter position Co magnets of IT side by side.

In the disc in Example 5, the magnetic field of the Co magnet was changed from 0.6T to 0.5T.

In the tape in Example 5, the magnetic field of the Co magnet was changed from 0.6T to 0.5T.

In Example 6, the line pressure at calendering of 300 kg/cm (294 kN/m) was chenged to 400 kg/cm (392 kN/m).

In Example 7, the line pressure at calendering of 300 kg/cm (294 kN/m) was changed to 200 kg/cm (196 kN/m).

In Example 10, the magnetic layer thickness was made 0.3 $\mu$m by simultaneous multilayer coating.

In Comparative Examples 1 and 2, the average tabular diameters were changed and deviated from the average tabular diameter of the present invention.

In the disc in Comparative Example 3, the magnetic field of the Co magnet was changed from 0.6T to 0.4T, which was deviated from the perpendicular factor of SQ according to the present invention.

In the tape in Comparative Example 3, the magnetic field of the Co magnet was changed from 0.6T to 0.4T, which was deviated from the perpendicular factor of SQ according to the present invention.

In Comparative Example 4, the line pressure at calendering of 300 kg/cm (294 kN/m) was changed to 200 kg/cm (196 kN/m), and calendering temperature from 90° C. to 80° C., hence the specific surface area and total pore volume deviated from those in the present invention.

In Comparative Example 5, the line pressure at calendering of 300 kg/cm (294 kN/m) was changed to 400 kg/cm (392 kN/m), and calendering temperature from 90° C. to 100° C., hence the specific surface area and total pore volume deviated from those in the present invention.

In Comparative Examples 6 and 7, the amount of the carbon black in the lower layer was changed from 20 parts to 60 parts, hence the specific surface area and total pore volume deviated from those in the present invention.

In Comparative Example 8, the magnetic layer thickness was made 0.4 $\mu$m which was deviated from the magnetic layer thickness according to the present invention.

It is understood from the results shown in Table 1 that Examples which satisfy the requisites of the present invention are markedly excellent in S/N ratio and C/N ratio as compared with Comparative Examples which do not satisfy any requisites of the present invention.

EFFECT OF THE INVENTION

The present invention can provide a magnetic recording medium for high density recording which is markedly excellent in S/N ratio and C/N ratio even when combined with an MR head, which has been realized by a magnetic recording medium comprising a support having provided thereon a magnetic layer containing a ferromagnetic powder and a binder as main components, wherein the ferromagnetic powder is a hexagonal ferrite powder having an average tabular diameter of from 15 to 40 nm, the perpendicular factor of squareness ratio SQ of the magnetic layer is from 0.1 to 0.55, the specific surface area and the total pore volume per mass of the magnetic layer by a nitrogen adsorption method are from 0.1 to 50 $m^2/g$ and from 0.001 to 1 ml/g, and the magnetic layer thickness is from 0.02 to 0.3 $\mu$m.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having provided thereon a magnetic layer containing a ferromagnetic powder and a binder as main components, wherein the ferromagnetic powder is a hexagonal ferrite powder having an average tabular diameter of from 15 to 40 nm, the perpendicular factor of squareness ratio SQ of the magnetic layer is from 0.1 to 0.55, the specific surface area and the total pore volume per weight of the magnetic layer by a nitrogen adsorption method are from 0.1 to 50 $m^2/g$ and from 0.001 to 1 ml/g, respectively, and the magnetic layer thickness is from 0.02 to 0.3 $\mu$m.

2. The magnetic recording medium as in claim 1, which is used in the reproduction using an MR head.

3. The magnetic recording medium as in claim 1, which is a magnetic tape.

4. The magnetic recording medium as in claim 1, which is a magnetic disc.

* * * * *